United States Patent [19]
Tsuji

[11] Patent Number: 6,049,884
[45] Date of Patent: Apr. 11, 2000

[54] INFORMATION PROCESSING APPARATUS WITH HIBERNATION FUNCTION

[75] Inventor: Hiroyuki Tsuji, Tokyo, Japan

[73] Assignee: Kabushiki Kaisha Toshiba, Kawasaki, Japan

[21] Appl. No.: 09/074,385

[22] Filed: May 8, 1998

[30] Foreign Application Priority Data

Jun. 12, 1997 [JP] Japan ................................... 9-155556

[51] Int. Cl.[7] .............................. G06F 1/30; G06F 12/16
[52] U.S. Cl. ........................... 713/323; 713/340; 307/66
[58] Field of Search ................................ 713/300, 320, 713/323, 340; 710/18, 48, 260; 714/14, 22, 24; 307/66, 52

[56] References Cited

U.S. PATENT DOCUMENTS

| | | | |
|---|---|---|---|
| 4,907,150 | 3/1990 | Arroyo et al. ........................ | 713/323 |
| 5,485,623 | 1/1996 | Kurokawa et al. ........................ | 714/22 |
| 5,748,971 | 5/1998 | Choi et al. ............................... | 713/320 |
| 5,822,600 | 10/1998 | Hallowell et al. ........................ | 713/340 |

*Primary Examiner*—Gopal C. Ray
*Attorney, Agent, or Firm*—Finnegan, Henderson, Farabow, Garrett & Dunner, L.L.P.

[57] ABSTRACT

Upon receiving a pre-processing interrupt signal for starting hibernation from a battery driving control unit via an I/F, a control means turns on the panel power supply of a display unit as part of a power saving function via a power saving control unit to drop the battery voltage to a hibernation start voltage, thus executing forced hibernation. After that, upon receiving an interrupt signal for starting hibernation, the control unit starts a storage means (HDD) via the power saving control unit to control forced hibernation.

12 Claims, 6 Drawing Sheets

INFORMATION PROCESSING APPARATUS WITH HIBERNATION FUNCTION

BACKGROUND OF THE INVENTION

This application is based on Japanese Patent Application No. 9-155556, filed on Jun. 12, 1997, the content of which is cited herein by reference.

The present invention relates to a hibernation control method for a battery drivable information processing apparatus with a hibernation function, and a battery drivable electronic equipment with a hibernation function.

Conventionally, in a compact electronic equipment such as a battery drivable, portable personal computer with a hibernation function, the control microprocessor in the equipment reads charge/discharge control data present in a battery, and executes charge/discharge control based on the read data.

In order to extend the battery-driven time, such equipment has a power saving function to control the power supply of an LCD (liquid crystal display), HDD (hard disk drive), and the like. Furthermore, in order to protect user data, memory data is saved in a nonvolatile storage medium such as a hard disk by forced hibernation at low battery level.

However, in the above-mentioned prior art, when the equipment is to be driven by a battery up to nearly low battery level in a low-load state by the power saving function, e.g., by turning off the motor of the HDD, and the backlight of the LCD, if abrupt load variations such as forced hibernation (a suspend/resume function of suspending operation by storing active data in a hard disk drive (HDD) and resuming data stored in the HDD after power ON) for saving user data, or the like have occurred, low-battery control that detects the battery voltage/current in a battery driving mode cannot catch up with such variations, and the battery is discharged excessively. That is, the power supply voltage is monitored periodically (e.g., at 1- or 2-sec intervals) by a monitoring circuit so as not to cause detection errors, but the load current is being supplied during this interval. In this case, when a circuit such as a CPU, disk drive, or the like, that causes large load variations operates, the voltage drops suddenly. On the other hand, batteries have different discharge characteristics depending on their manufacturers, i.e., the manufacturer which uses a material with high conduction performance of lithium ions of a battery cell and the one which does not use such material, and a low-battery voltage is set at different values in correspondence with the discharge characteristics.

Conventionally, the low-battery voltage must be corrected to a point that hardly causes load variations as a precaution to take for a battery which is ready to use but has poor discharge characteristics. As a result, the driving time of a battery with high discharge characteristics is decreased, and the battery capacity cannot be effectively used, thus shortening the battery-driving time.

The prior art in such case will be explained below with reference to FIGS. 1 and 2.

In the conventional hibernation, when a battery that causes large capacity variations due to load variations is used, when hibernation is executed (HT: hibernation time) after a battery voltage (VBATT) has reached a low battery level (LV1) in a low-load state (e.g., the battery is discharged to about 95% of its capacity), as shown in FIG. 1, since electric power is consumed to drive the HDD, the battery voltage (VBATT) drops below a battery-driving lowest voltage level (LV3) and reaches an overdischarge level. As a consequence, normal hibernation cannot be done, resulting in data destruction, equipment failures, and the like.

In order to prevent the voltage upon completion of hibernation from reaching an overdischarge level, conventionally, the battery voltage level (low battery level) at the beginning of hibernation is shifted to a level (LV0) higher than the above-mentioned level (LV1) (by correcting the low-battery voltage), thus normally executing hibernation even when a battery that causes large capacity variations due to load variations is used.

However, in this case, since the battery voltage level (low battery level) at the beginning (C) of hibernation is shifted toward higher voltages, the battery driving time is shortened by a battery driving time (TSF) corresponding to that level shift, and consequently, the driving time of a battery with high discharge characteristics is decreased considerably, i.e., the battery cannot be effectively used, thus shortening the battery driving time.

BRIEF SUMMARY OF THE INVENTION

It is an object of the present invention to provide a hibernation control method for an information processing apparatus and a battery drivable electronic equipment, which can assure a long battery driving time by effectively using a battery and can surely save data at low battery level even when a battery drivable information processing apparatus or portable electronic equipment with a hibernation function is driven using batteries having different discharge characteristics depending on load variations.

A battery drivable electronic equipment with a hibernation function according to the present invention is characterized in that the lowest voltage level that allows battery driving can be set at low potential by appropriately detecting the battery voltage/current value at the beginning of hibernation while suppressing abrupt load variations upon executing forced hibernation from a low-load state during power saving operation, whereby even when batteries having different discharge characteristics depending on load variations are used in driving, a highly reliable data saving function can be assured, and the battery driving time can be prolonged.

More specifically, a hibernation control method for a battery drivable information processing apparatus with a hibernation function according to the present invention is characterized in that the battery capacity is monitored in a battery driving mode, and upon detecting a specific state indicating a small remaining capacity, the discharge current of the battery is increased to drop the battery voltage to a hibernation start voltage to execute forced hibernation. With this method, the lowest voltage level that can drive the battery (the lowest operation voltage of an IC, e.g., 6V for a 5V IC) can be set at low potential, and even when batteries having different discharge characteristics depending on load variations are used in driving, the battery driving time can be prolonged by effectively using the batteries, and a highly reliable data saving function can be assured.

Also, a hibernation control method for an information processing apparatus which can execute a power saving function and hibernation function in a battery driving mode according to the present invention is characterized in that the battery state is monitored in a battery driving mode in which the power saving function is active, and upon detecting a specific battery state near a low battery state, some or all power saving states of the power saving function are canceled to drop the battery voltage to a hibernation start voltage, thus executing forced hibernation. With this method, the lowest voltage level that allows battery driving can be set at low potential, and even when batteries having different discharge characteristics depending on load variations are used in driving, the battery driving time can be prolonged by effectively using the batteries, and a highly reliable data saving function can be assured.

Furthermore, a hibernation control method for an information processing apparatus which can execute a power saving function and hibernation function in a battery driving mode according to the present invention is characterized in that a discharge current is increased in the battery driving mode in which the power saving function is active to suppress abrupt load variations upon executing forced hibernation from a low-load state during the power saving operation, whereby the variation width of the battery voltage due to different discharge characteristics of batteries can be minimized, and the lowest voltage level that allows battery driving can be set at low potential to extend the battery driving time. As the discharge characteristics of a battery, when the load is light, the voltage level abruptly drops at a certain timing, but when the load is heavy, the voltage level drops after a certain voltage level is maintained for a longer period of time than when the load is light. For this reason, the time for which a certain voltage level is maintained is prolonged. Furthermore, since the voltage value is monitored by a digital sample value, sampling is easier to do when flat characteristics continue for a long period of time. For this reason, an accurate voltage level can be measured, and consequently, the battery voltage level at the beginning of hibernation can be accurately determined.

An electronic equipment that can execute a power saving function and hibernation function in a battery driving mode according to the present invention is characterized by comprising discharge means for suppressing abrupt load variations upon executing forced hibernation from a low load state during the power saving operation in the battery driving mode in which the power saving function is active, and control means for starting hibernation on the basis of a battery voltage upon the load variations suppressed by the discharge means, whereby the lowest voltage level that allows battery driving is set at low potential, and even when batteries having different discharge characteristics depending on load variations are used in driving, the battery driving time can be extended by effectively using the batteries, and a highly reliable data saving function can be assured.

A battery drivable electronic equipment with a hibernation function is characterized by comprising means for monitoring a battery capacity in a battery driving mode, and means for, when the monitoring means detects a specific battery state in which a remaining capacity is small, applying a predetermined current load to drop the battery voltage to a hibernation start voltage so as to execute hibernation, whereby the lowest voltage level that allows battery driving is set at low potential to prolong the battery driving time.

A battery drivable electronic equipment with a hibernation function is characterized by comprising a battery driving controller for monitoring a battery state, at least one load circuit as a target of a power saving function, and a controller for controlling hibernation, and in that the controller has control means for canceling a power saving mode of the at least one load circuit in the power saving mode upon receiving a detection signal of a predetermined battery voltage state near low battery state from the battery driving controller, to increase a battery driving current and to drop the battery voltage to a hibernation start voltage so as to start hibernation, whereby the battery driving time can be prolonged by effectively using the batteries, and a highly reliable battery saving function can be assured.

According to the present invention, a battery drivable electronic equipment with a suspend/resume function which sets a suspend state by storing active data in a rotary storage medium and shutting down the power supply of a system, and resuming the data stored in the rotary storage medium after power ON is characterized by comprising a battery for supplying a power supply voltage to individual devices of the electronic equipment, battery capacity detection means for detecting the remaining capacity of the battery, instruction means for instructing to execute suspend processing to suspend operation, and current control means for increasing a driving current required for executing the suspend processing stepwise in accordance with an instruction from the instruction means.

The above electronic equipment is characterized in that the current control means executes the suspend processing after it drives display means or alarming means of the individual devices.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiment of the present invention will be described hereinafter with reference to the accompanying drawings.

Figure 3:
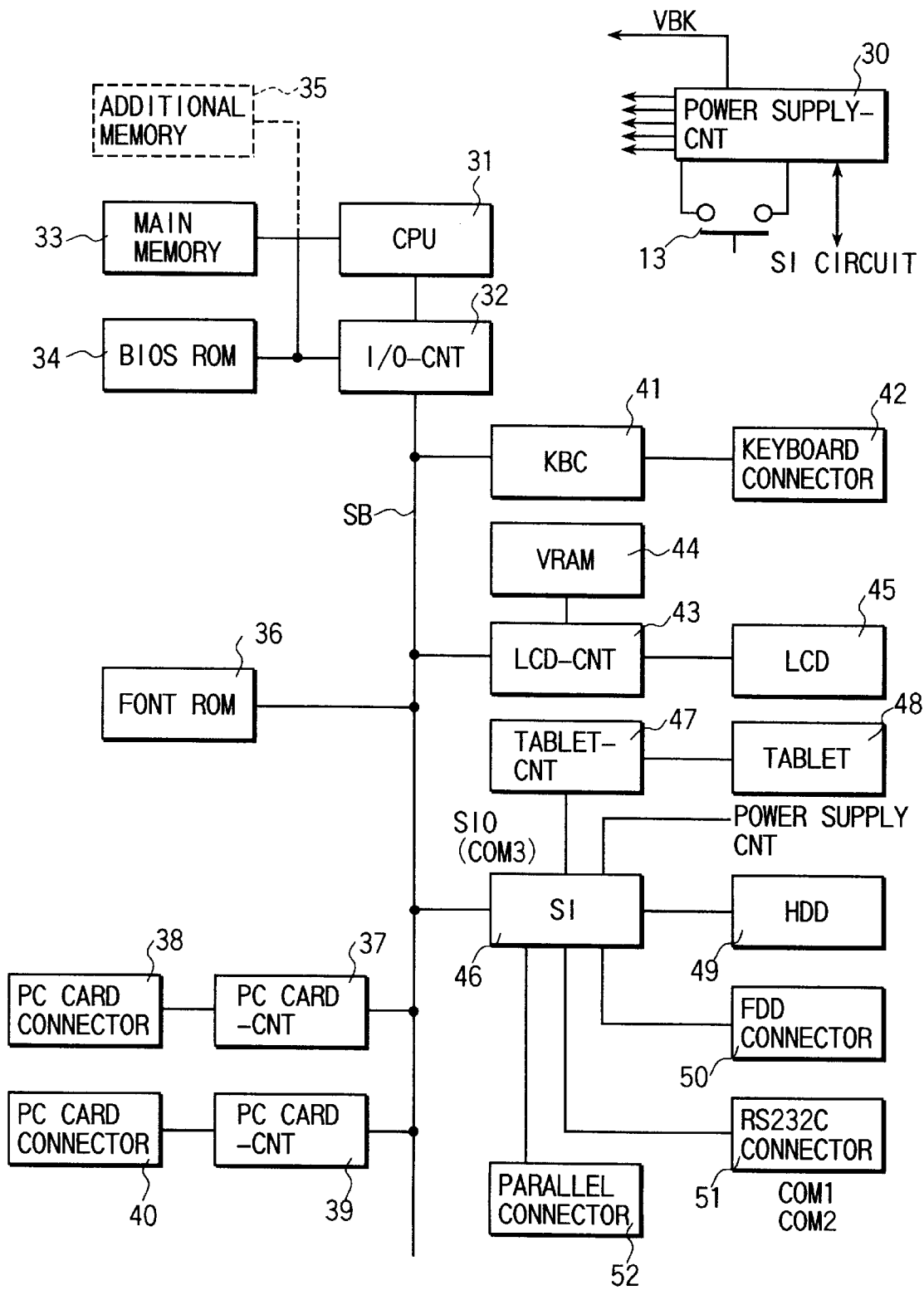
FIG. 3 is a block diagram showing the hardware arrangement of principal part according to an embodiment of the present invention.

FIG. 3 is a system block diagram showing an example of a portable computer as a battery drivable electronic equipment to which the hibernation control method of the present invention is applied.

In FIG. 3, a power supply controller 30 is connected to a power switch 13, and controls the power supply of the entire system. A microprocessor (CPU) 31 controls the operation of the entire system. An I/O controller 32 performs I/O-control of the microprocessor 31. The microprocessor 31 accesses a BIOS (Basic Input and Output System)-ROM 34 that stores a BIOS, and a main memory 33 (and an additional memory 35 if available) to start a program in accordance with an instruction, thereby executing various kinds of data processing.

The I/O controller 32 executes I/O control between the individual circuits connected to a system bus SB and the CPU 31 in accordance with the BIOS stored in the BIOS-ROM 34. A font ROM 36 that stores character font data, first PC card controller 37, second PC card controller 39, keyboard controller 41, LCD (liquid crystal display) controller 43, and SI (Super Integration) circuit 46 are connected to the system bus SB.

The PC card controllers 37 and 39 execute I/O control of cards (PC cards) when PC cards such as a memory card, modem card, and the like that extend various functions of a personal computer are connected via PC card connectors 38 and 40.

The keyboard controller 41 performs I/O control of a keyboard (not shown) when it is externally connected via a keyboard connector 42.

The LCD controller 43 maps display data sent via the system bus SB onto a VRAM 44, and performs display control of an LCD panel 45 on the front surface of the apparatus housing. The LCD panel 45 is of transmission type having, e.g., a 640 (vertical)×480 (horizontal) dot matrix, and a backlight (not shown) using, e.g., a fluorescent tube is embedded in its rear surface side. The SI circuit 46 is connected to the power supply controller 30, as will be described later, and is also connected to a tablet controller 47, internal hard disk drive (HDD) 49, floppy disk drive (FDD) connector 50, RS232C connector 51, and parallel connector 52 to execute I/O control of data with these circuits.

The tablet controller 47 performs I/O control of a tablet 48 integrally formed on the LCD panel 45, and sequentially outputs coordinate position data upon point designation or writing on the tablet 48 with a stylus pen (not shown) to the I/O controller 32 via the SI circuit 46.

The FDD connector 50 is used for externally connecting an FDD, and the RS232C connector 51 has two serial ports COM1 and COM2 for connecting a data communication device such as a modem. The parallel connector 52 is used for connecting an equipment such as a printer for inputting/outputting parallel data.

Figure 4:
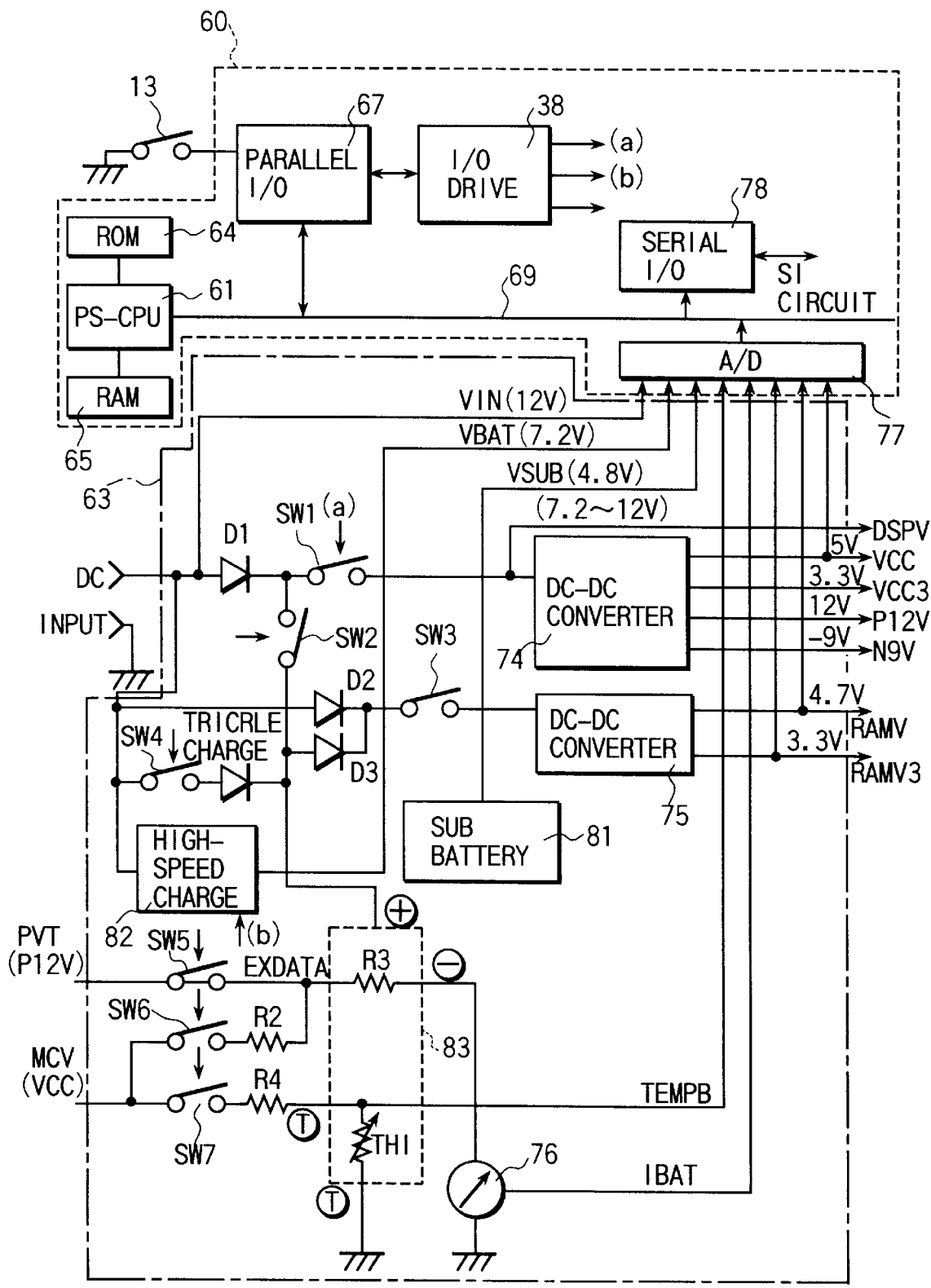
FIG. 4 is a circuit diagram for explaining the operation of a hibernation control means in the embodiment.

FIG. 4 is a detailed circuit diagram of the power supply controller 30 shown in FIG. 3.

A power supply control microcomputer 60 is a one-chip microcomputer comprising a power supply control CPU (PS-CPU) 61, internal ROM 64, internal RAM 65, parallel I/O 67, I/O driver 68, A/D converter 77, and serial I/O 78. The PS-CPU 61 monitors and controls the power supply all the time irrespective of the power ON/OFF state, and executes central management of the system power supply including control of a power supply circuit 63 for generating and outputting various operation power supply voltages for system operations, ON/OFF control of the power supply upon operation of the power switch 13, identification of a battery pack attached, charge/discharge control in accordance with the charge/discharge control parameters of the battery pack, and the like, in accordance with a power supply control program stored in the internal ROM 64.

The power supply circuit 63 as a main element of the power supply controller 30 has a switch SW1 which connects/disconnects power supply to the respective circuits in the system in accordance with a control signal (a) output from the PS-CPU 61 via the parallel I/O 67 and I/O driver 68.

More specifically, the switch SW1 connects/disconnects a power supply output (DC input in FIG. 4) from an externally connected power supply adapter (not shown) via a diode D1, or an input from a power supply output VBAT (7.2V) of a battery pack 83 to a DC—DC converter 74 via a switch SW2, and a supply output of a display voltage DSPV for the LCD panel 45 and its backlight.

The DC input signal output from the power supply adapter (not shown) is directly supplied to the A/D converter 77 as VIN (12V), and is also supplied to a DC—DC converter 75 and sub battery 81 via a diode D2 and switch SW3, and to the battery pack 83 via a switch SW4 and diode D4 as a trickle charge signal. Also, the DC input signal is similarly supplied to the battery pack 83 via a high-speed charge circuit 82 that operates in response to a control signal (b) from the I/O driver 68.

The battery pack 83 receives a power supply voltage by trickle charge or high-speed charge, and is charged to output a primary power supply voltage. The primary power supply voltage is supplied to the DC—DC converter 74 via the switches SW2 and SW1, and is also supplied to the DC—DC converter 75 via a diode D3 and the switch SW3.

Also, the battery pack 83 receives a voltage PVT ranging from 7.2V to 12V and a 5V voltage MCV. More specifically, the voltage PVT (12V) via a switch SW5 and the voltage MCV (Vcc) via a switch SW6 and resistor R2 are connected to one terminal of a resistor R3 in the battery pack 83, and the other terminal of the resistor R3 is connected to an ammeter 76 via the minus terminal of the power supply. A current value IBAT obtained by the ammeter 76 is supplied to the A/D converter 77. A voltage level signal EXDATA (not shown) at this detection terminal is also supplied to the A/D converter 77.

Furthermore, the voltage MCV is connected to the other terminal of a thermistor TH1, one terminal of which is grounded, in the battery pack 83 via a switch SW7, resistor R4, and temperature detection terminal T, and a voltage level signal TEMPB at that temperature detection terminal T is supplied to the A/D converter 77.

The sub battery 81 outputs a primary power supply voltage to the DC—DC converter 75 in place of the battery pack 83 when the battery pack 83 is not attached, and its generation voltage VSUB (4.8V) is also supplied to the A/D converter 77.

Upon receiving the primary power supply voltage via the switch SW1, the DC—DC converter 74 generates circuit operation voltages Vcc (MCV to be described later) (5V), Vcc3 (3.3V), P12V (PVT to be described later) (12V), and N9V (−9V) as circuit operation power supply voltages (secondary power supply voltages) in the apparatus, and supplies the generated voltages to the individual circuits. Especially, the converter 74 supplies the circuit operation voltage Vcc (5V) to the A/D converter 77.

On the other hand, upon receiving the primary power supply voltage via the switch SW3, the DC—DC converter 75 generates voltages RAMV (4.7V) and RAMV3 (3.3V) as backup power supply voltages VBK (secondary power supply voltages), and supplies them to the A/D converter 77, main memory 33, and additional memory 35.

Figure 5:
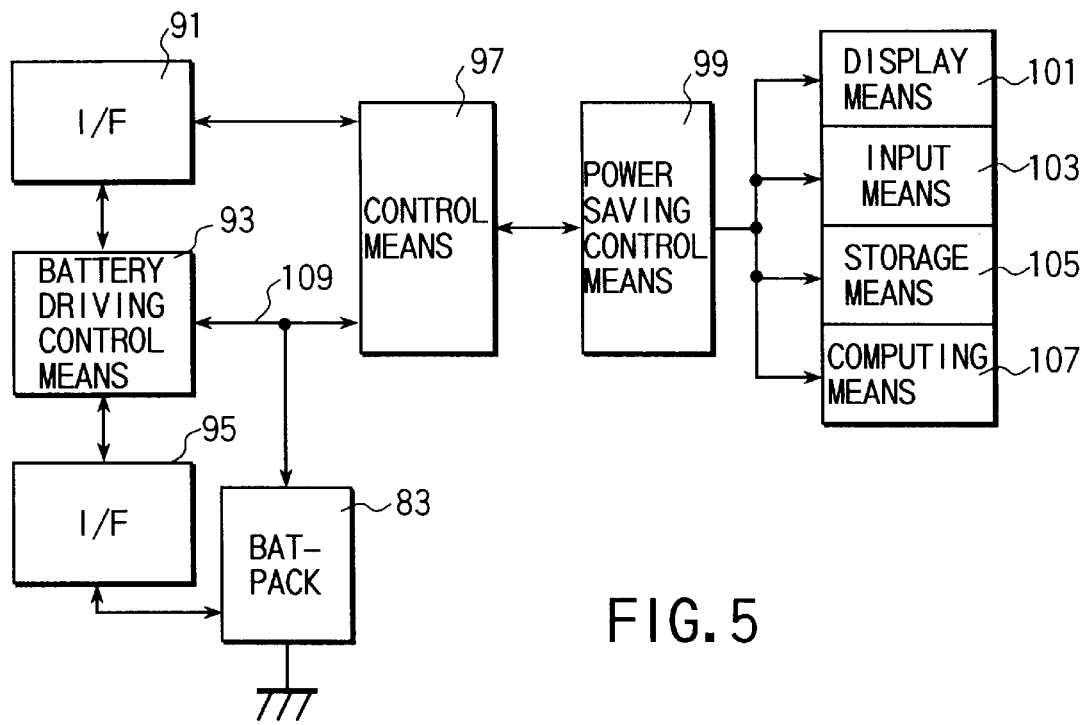
FIG. 5 is a block diagram for explaining the operation of the hibernation control means in the embodiment.

FIG. 5 is a block diagram showing the arrangement of principal part according to the embodiment of the present invention.

In FIG. 5, the battery pack 83 as the driving power supply of the system comprises, e.g., a lithium secondary battery, and includes a data holding means for holding the voltage and current values (voltage/current value) of the battery.

A battery driving control means 93 performs charge/discharge management of the battery 83. More specifically, the battery driving control means 93 reads the voltage/current value in the battery pack 83 via an I/F 95 and monitors the state of the battery pack 83. When the means 93 detects a specific battery state (a state for starting pre-processing for hibernation (see reference symbol a in FIG. 8 to be described later)) near a low battery state in the battery driving mode, it sends a pre-processing interrupt signal for starting hibernation to a control means 97 via an I/F 91. After that, when the means 93 detects the state for starting hibernation (see LV2 and VBATT indicated by the solid curve in FIG. 8 to be described later), it similarly outputs an interrupt signal for starting hibernation to the control means 97 via the I/F 91. Note that a signal indicating a low battery signal is supplied from the battery driving control means 93 to the control means 97 via a line 109.

The control means 97 executes predetermined processing (e.g., system power supply control). Upon receiving the pre-processing interrupt signal for starting hibernation from the battery driving control means 93, the means 97 cancels some or all power saving states (in this case, it turns on the panel power supply of a display means 101) of the power saving function via a power saving control means 99 to drop the battery voltage to a hibernation start voltage, thus executing forced hibernation. Furthermore, upon receiving the interrupt signal for starting hibernation after that, the means 97 controls execution of forced hibernation by starting a storage means (HDD in this case) via the power saving control means 99. As described above, according to the present invention, the loads are controlled to approach the hibernation state stepwise.

The power saving control means 99 individually sets/cancels system elements as power saving control targets in accordance with the state of the power saving mode. In this case, the means 99 cancels the power saving states of specific system elements, e.g., the display means (LCD) 101, storage means (HDD) 105, and the like in accordance with an instruction from the control means 97.

System elements 101 to 107 are those serving as power saving control targets, and are the display means 101 (corresponding to 45 in FIG. 3) comprising an LCD (liquid crystal display) with a backlight, input means 103 (corresponding to 41 and 47 in FIG. 3) such as a keyboard, tablet, mouse, and the like, the storage means 105 (corresponding to 49 in FIG. 3) such as a HDD (hard disk drive) used for saving data in the hibernation mode, and a computing means 107 (corresponding to 31 in FIG. 3) including a CPU and its peripheral circuits (clock control circuit and the like). In this embodiment, the display means as a battery-driven load for increasing the discharge current is selectively canceled from the power saving state and is subjected to driving control prior to start of execution of hibernation under the control of the control means 97. In this embodiment, the panel power supply is turned on. The present invention turns on the panel power supply as a method of increasing the discharge current. However, the present invention is not limited to such specific method, and an element used for increasing the discharge current may be one or a combination of the display means, input means, storage means, computing means, and other hardware elements. Other hardware elements may include a means for applying a current load by increasing the CPU clock speed by controlling CPU clocks, a means for applying a current load by operating a sound circuit, and the like.

Figure 6:
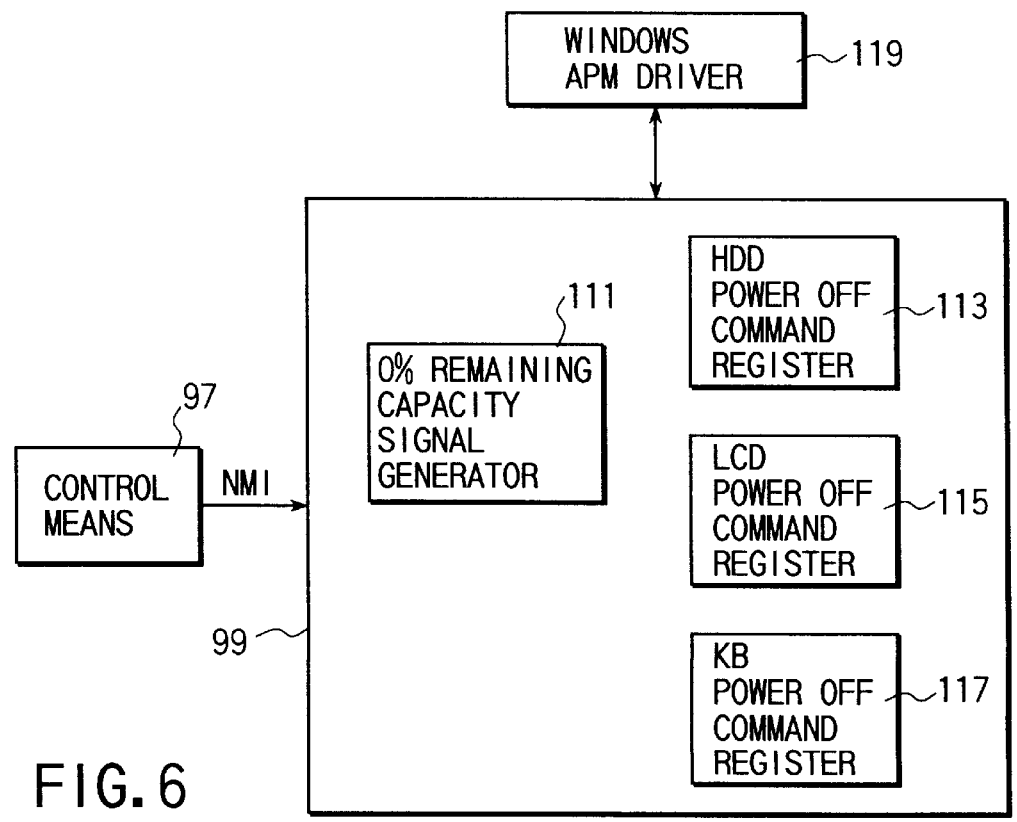
FIG. 6 is a block diagram showing the details of a power saving control means shown in FIG. 5, and its peripheral means.

FIG. 6 is a block diagram showing the details of the power saving control means 99 shown in FIG. 5 and its peripheral means. In FIG. 6, the power saving control means 99 comprises a 0% remaining capacity signal generator 111, HDD power off command register 113, LCD power off command register 115, and KB power off command register 117. A WINDOWS APM driver 119 is an "APM (Application Power Management) Driver" included in "WINDOWS" as an operating system available from Microsoft Corp. (USA), and sets commands for turning off one or a combination of the HDD 105, LCD 101, and KB 103 in the corresponding registers 113, 115, and 117.

Figure 7:
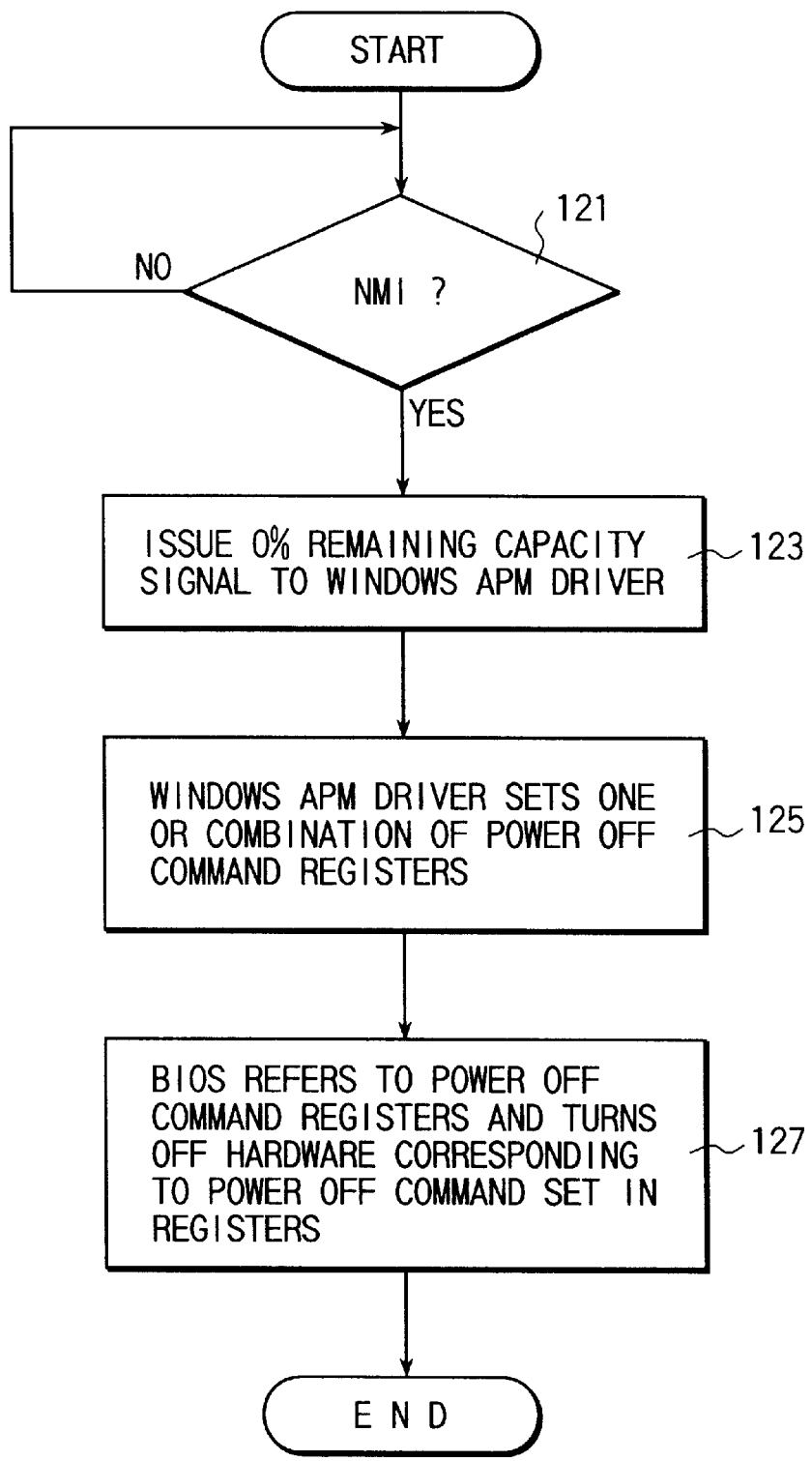
FIG. 7 is a flow chart showing the operation of the power saving control means and a WINDOWS APM DRIVER shown in FIG. 6.

FIG. 7 is a flow chart showing the operation of the power saving control means 99 and WINDOWS APM DRIVER 119.

Figure 8:
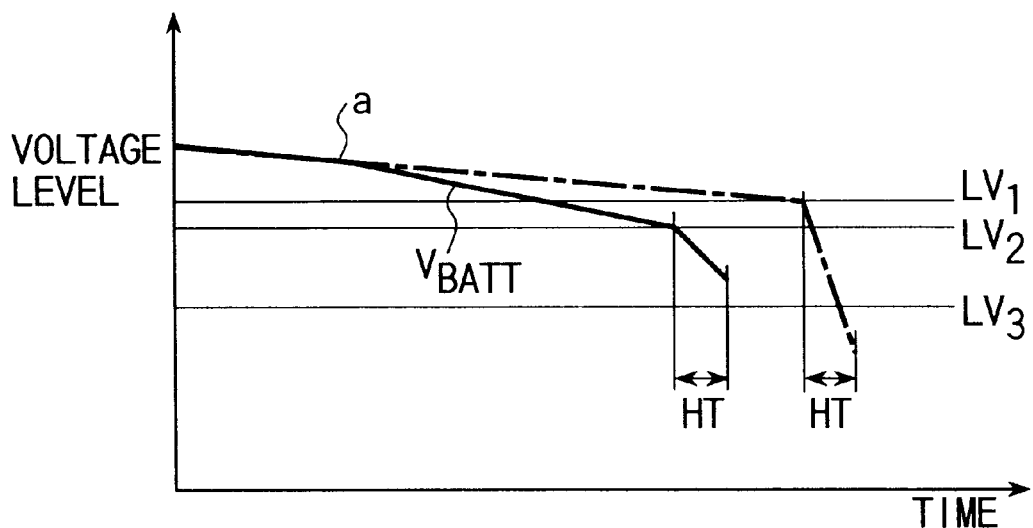
FIGS. 8 and 9 are charts for explaining the operation of the hibernation control means.
Figure 9:
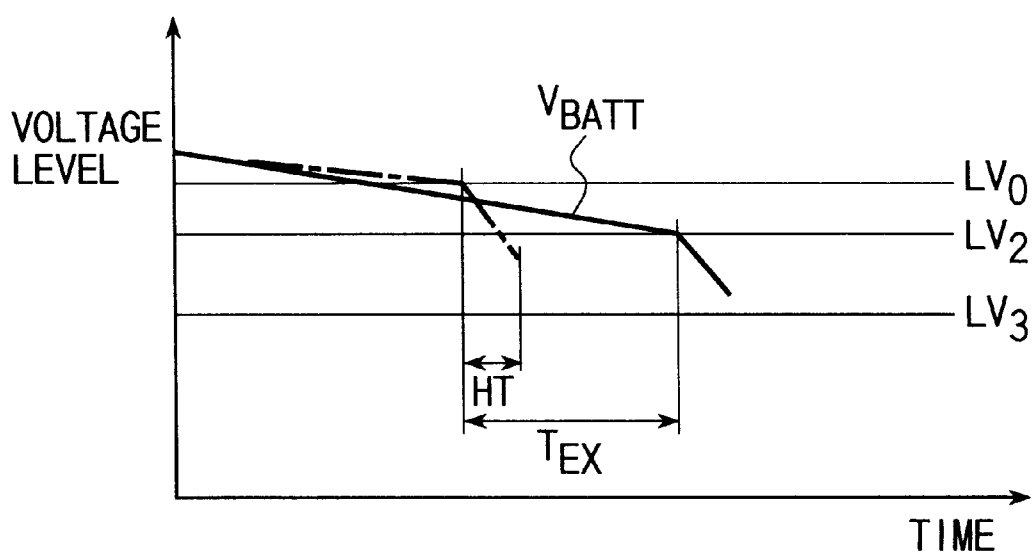

FIGS. 8 and 9 are charts for explaining the operation of a hibernation control means according to the embodiment of the present invention. In FIGS. 8 and 9, the solid curve indicates the battery voltage (VBATT) upon hibernation control according to the embodiment of the present invention, and the broken curve indicates the battery voltage (VBATT) upon conventional hibernation control.

Figure 1:
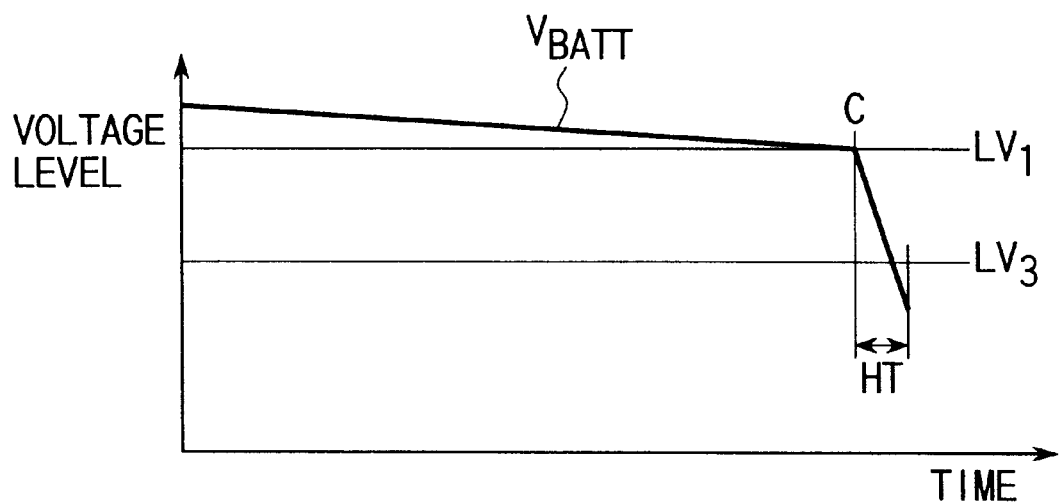
FIG. 1 is a chart for explaining the operation of a conventional hibernation control means.
Figure 2:
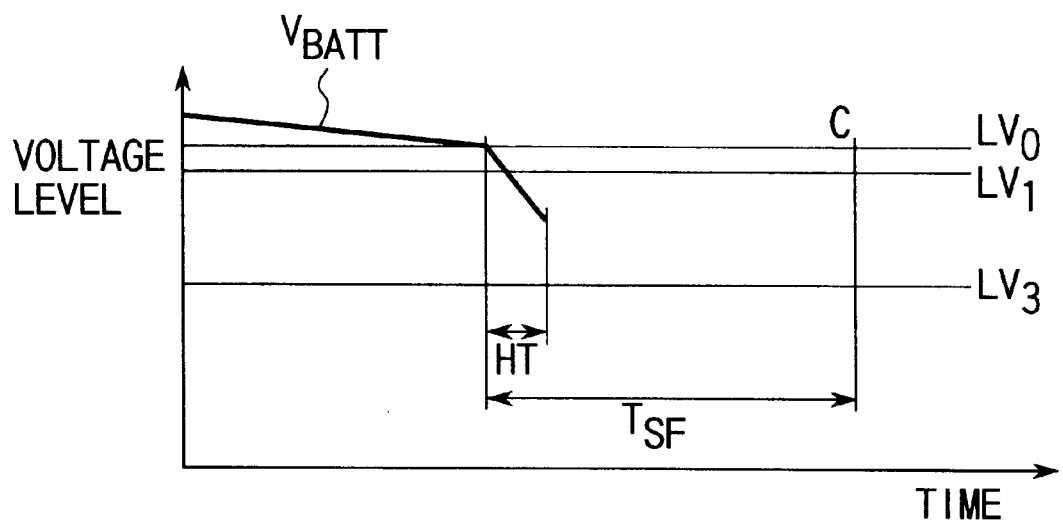
FIG. 2 is a chart for explaining the operation of the conventional hibernation control means.

In FIGS. 8 and 9, LV0 represents the conventional hibernation start voltage level (low battery level) shown in FIGS. 1 and 2 for explaining the prior art, LV1 the low battery level in a low load state shown in FIGS. 1 and 2 for explaining the prior art, LV2 the battery voltage level (low battery level) at the beginning of hibernation according to the embodiment of the present invention, and LV3 the battery driving lowest voltage level used for determining the overdischarge level shown in FIGS. 1 and 2 for explaining the prior art. Also, a represents the panel power supply ON timing of the display means 101 according to the embodiment of the present invention, TEX the battery driving time extended by the embodiment of the present invention, HT the hibernation time.

Hibernation control at low battery level according to the embodiment of the present invention will be described below with reference to FIGS. 5 to 9.

The battery driving control means 93 reads in advance voltage/current data near the low battery level stored in the battery 83 as data used for determining the panel power supply ON timing via the I/F 95.

The battery driving control means 93 repetitively reads the battery voltage/current value data in the battery 83 to monitor the state of the battery 83. During monitoring the battery state, when the means 93 recognizes based on the battery voltage/current value data in the battery 83 that the battery voltage (VBATT) has reached a pre-set panel power supply ON timing (a), it sends a pre-processing interrupt signal for starting hibernation to the control means 97 via the I/F 91.

Upon receiving the pre-processing interrupt signal for starting hibernation from the battery driving control means 93 via the I/F 91, the control means 97 turns on the panel power supply of the display means (LCD) 101 as a part of the power saving function via the power saving control means 99 to increase the discharge current and to drop the battery voltage to a hibernation start voltage, thus executing forced hibernation. More specifically, the control means 97 detects that the remaining capacity of the battery 83 is 0%, and issues an NMI (Non Maskable Interrupt) signal indicating that fact to the 0% remaining capacity signal generator 111 in the power saving control means 99. If the 0% remaining capacity signal generator 111 receives the NMI signal from the control means 97 in step 121 in FIG. 7, it generates a 0% remaining capacity signal and issues it to the WINDOWS APM DRIVER 119 in step 123. The WINDOWS APM DRIVER 119 sets a predetermined power off command in one or a combination of the HDD power off command register 113, LCD power off command register 115, and KB power off command register 117 in response to the 0% remaining capacity signal from the 0% remaining capacity signal generator 111 in step 125. As a result, a BIOS (Basic Input and Output System) program in the BIOS-ROM 34 refers to the registers 113, 115, and 117 and turns off one or a combination of the power supplies of the circuits 113, 115, and 117 corresponding to the set power off command or commands.

In this embodiment, for example, forced hibernation is executed about 1 or 2 minutes after the panel power supply is turned on. When the panel power supply has already been ON, forced hibernation is not executed.

Furthermore, when the battery driving control means 93 detects based on the battery voltage/current value data in the battery 83 that the battery voltage (VBATT) has reached the battery voltage level (low battery level) LV2 at the beginning of hibernation, it sends an interrupt signal for starting hibernation to the control means 97 via the I/F 91. In this manner, the loads are controlled to approach the hibernation state stepwise.

Upon receiving the interrupt signal for starting hibernation from the battery driving control means 93, the control means 97 starts the storage means (HDD) 105 as part of the power saving function, and executes hibernation including a data write into that storage means (HDD) 105.

As described above, since the loads are controlled to approach the hibernation state stepwise, abrupt load variations can be suppressed, and hibernation control at low battery level can be started from a reliable point.

More specifically, as has been described in the above embodiment, in the battery driving mode of the system, the state of the battery 83 is monitored, and upon detecting a specific state with small remaining capacity, for example, the panel power supply of the display means (LCD) 101 is turned on to increase the discharge current and to drop the battery voltage (VBATT) to a hibernation start voltage, thus controlling the loads to approach the hibernation state stepwise and executing forced hibernation. In this way, the lowest voltage level that allows battery driving can be set at low potential (LV0 → LV2), and even when batteries having different discharge characteristics due to load variations are used in driving, the battery driving time can be prolonged by "TEX" shown in FIG. 9 by effectively using the batteries, and a highly reliable data saving function can be assured.

In the above embodiment, the display means and storage means are sequentially turned on as power saving control means for hibernation control. Alternatively, as battery-driven loads for increasing the discharge current, for example, other loads such as the input means and the like may be used. For example, a sound circuit and storage means may be turned on in turn, or after the CPU clock speed is increased, the storage means may be turned on.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A hibernation control method in a battery drivable information processing apparatus with a hibernation function as a suspend/resume function which sets a suspend state by storing active data in a hard disk drive and shutting down a power supply of a system, and resumes the data stored in the hard disk drive after power ON, comprising the steps of:
   monitoring a capacity of a battery in a battery driving mode;
   increasing a discharge current of the battery upon detecting a specific state in which a remaining capacity of the battery is small; and
   thereafter executing forced hibernation.

2. A hibernation control method in an information processing apparatus that is capable of executing a power saving function and a hibernation function as a suspend/resume function which sets a suspend state by storing active data in a hard disk drive and shutting down a power supply of a system, and resumes the data stored in the hard disk drive after power ON in a battery driving mode, comprising the steps of:
   monitoring a battery state in the battery driving mode in which the power saving function is active; and
   dropping a battery voltage to a hibernation start voltage by canceling some or all power saving states of the power saving function upon detecting a specific battery state near a low battery state to execute forced hibernation.

3. A hibernation control method in an information processing apparatus that is capable of executing a power saving function and a hibernation function as a suspend/resume function which sets a suspend state by storing active data in a hard disk drive and shutting down a power supply of a system, and resumes the data stored in the hard disk drive after power ON in a battery driving mode,
   wherein a discharge current is increased in the battery driving mode in which the power saving function is active, so as to suppress abrupt load variations upon execution of forced hibernation from a low load state during the power saving operation and to minimize a variation width of a battery voltage due to different discharge characteristics of batteries, thereby setting a lowest voltage level that allows battery driving at low potential and prolonging a battery driving time.

4. An electronic equipment that is capable of executing a power saving function and a hibernation function as a suspend/resume function which sets a suspend state by storing active data in a hard disk drive and shutting down a power supply of a system, and resumes the data stored in the hard disk drive after power ON in a battery driving mode, comprising:
   discharge means for suppressing abrupt load variations upon execution of forced hibernation from a low load state during the power saving operation in the battery driving mode in which the power saving function is active; and
   control means for starting execution of hibernation on the basis of a battery voltage upon variations of a load by said discharge means.

5. An equipment according to claim 4, wherein the battery comprises a lithium secondary battery.

6. An equipment according to claim 4, wherein a discharge current of the battery is increased by current load means including at least one of means for applying a current load by controlling a CPU clock, means for applying a current load by controlling an operation of a display panel, and means for applying a current load by controlling an operation of a sound circuit, thereby dropping the battery voltage to a hibernation start voltage.

7. A battery drivable electronic equipment with a hibernation function as a suspend/resume function which sets a suspend state by storing active data in a hard disk drive and shutting down a power supply of a system, and resumes the data stored in the hard disk drive after power ON in a battery driving mode, comprising:

means for monitoring a battery capacity in the battery driving mode; and means for, when said monitoring means detects a specific battery state with a small remaining capacity, applying a predetermined current load to drop a battery voltage to a hibernation start voltage so as to execute hibernation, whereby a lowest voltage level that allows battery driving is set at low potential and a battery driving time is prolonged.

8. An equipment according to claim 7, wherein the battery comprises a lithium secondary battery.

9. An equipment according to claim 7, wherein a discharge current of the battery is increased by current load means including at least one of means for applying a current load by controlling a CPU clock, means for applying a current load by controlling an operation of a display panel, and means for applying a current load by controlling an operation of a sound circuit, thereby dropping the battery voltage to the hibernation start voltage.

10. A battery drivable electronic equipment with a hibernation function as a suspend/resume function which sets a suspend state by storing active data in a hard disk drive and shutting down a power supply of a system, and resumes the data stored in the hard disk drive after power ON in a battery driving mode, comprising:

a battery driving controller for monitoring a battery state;

at least one load circuit as a target of a power saving function; and a controller for controlling execution of hibernation, wherein upon receiving a detection signal of a predetermined battery state near a low battery state from said battery driving controller, said controller cancels a power saving mode of said at least one load circuit in the power saving mode to increase a battery driving current and to drop a battery voltage to a hibernation start voltage so as to start hibernation.

11. An equipment according to claim 10, wherein the battery comprises a lithium secondary battery.

12. An equipment according to claim 10, wherein a discharge current of the battery is increased by current load means including at least one of means for applying a current load by controlling a CPU clock, means for applying a current load by controlling an operation of a display panel, and means for applying a current load by controlling an operation of a sound circuit, thereby dropping the battery voltage to a hibernation start voltage.

* * * * *

UNITED STATES PATENT AND TRADEMARK OFFICE
CERTIFICATE OF CORRECTION

PATENT NO. : 6,049,884
DATED : April 11, 2000
INVENTOR(S) : Hiroyuki TSUJI

It is certified that error appears in the above-identified patent and that said Letters Patent is hereby corrected as shown below:

Title Page, item [57], in the Abstract, lines 3 and 8, "means" should read --unit--.

Signed and Sealed this

Seventeenth Day of April, 2001

*Attest:*

NICHOLAS P. GODICI

*Attesting Officer*   *Acting Director of the United States Patent and Trademark Office*